US007519265B2

(12) United States Patent
Iggulden

(10) Patent No.: US 7,519,265 B2
(45) Date of Patent: Apr. 14, 2009

(54) METHOD AND APPARATUS FOR MAKING ARCHIVAL COPIES OF AUDIOVISUAL RECORDINGS

(75) Inventor: Jerry Iggulden, Los Angeles, CA (US)

(73) Assignee: TeleVentions, LLC, Los Angeles, CA (US)

( * ) Notice: Subject to any disclaimer, the term of this patent is extended or adjusted under 35 U.S.C. 154(b) by 860 days.

(21) Appl. No.: 10/993,655

(22) Filed: Nov. 19, 2004

(65) Prior Publication Data

US 2006/0110127 A1    May 25, 2006

(51) Int. Cl.
*H04N 5/93* (2006.01)
(52) U.S. Cl. .............................. 386/52; 386/45; 386/46; 386/95; 386/96; 386/125; 386/126; 725/25; 725/34; 725/35; 725/36; 725/123; 725/146
(58) Field of Classification Search ................... 386/46, 386/95–96, 125–126; 725/25, 34–36, 123, 725/146
See application file for complete search history.

(56) References Cited

U.S. PATENT DOCUMENTS

| | | | | |
|---|---|---|---|---|
| 5,968,147 | A * | 10/1999 | Polfer et al. ................... | 710/52 |
| 6,577,806 | B1 * | 6/2003 | Hirota .......................... | 386/46 |
| 6,920,641 | B1 * | 7/2005 | Hanai et al. .................. | 725/142 |
| 7,212,729 | B2 * | 5/2007 | Nakajima et al. ............. | 386/83 |
| 2002/0076195 | A1 | 6/2002 | Nakajima et al. | |
| 2005/0028208 | A1 * | 2/2005 | Ellis et al. ..................... | 725/58 |

OTHER PUBLICATIONS

Televentions, LLC, PCT Search Report and Written Opinion mailed Oct. 27, 2008, PCT Application No. PCT/US05/42394, 8 pages.

* cited by examiner

*Primary Examiner*—Thai Tran
*Assistant Examiner*—Jamie J Atala
(74) *Attorney, Agent, or Firm*—Blakely, Sokoloff, Taylor & Zafman, LLP

(57) ABSTRACT

Recorded audiovisual programs are aggregated for archival storage on another storage medium, such as a DVD. As related programs are temporarily recorded on a DVR, the lengths of the programs are summed and compared to the recording capacity of the DVD. When a sufficient number of programs have been temporarily recorded, a message is presented prompting the user to transfer the recordings to a DVD. Portions of the recorded programs, such as commercial messages, may be edited or deleted before transfer to the DVD. When programs are recorded onto a DVD, program information may also be recorded to assist in navigating among the recorded programs. The program information may also be used for the purpose of printing appropriate labels using a personal computer system.

7 Claims, 2 Drawing Sheets

METHOD AND APPARATUS FOR MAKING ARCHIVAL COPIES OF AUDIOVISUAL RECORDINGS

BACKGROUND OF THE INVENTION

1. Field of the Invention

This invention relates generally to the field of audiovisual recording. More particularly, the invention relates to a method and apparatus for making an archival copy of a plurality of recorded audiovisual programs.

2. Background

Since the advent of home video recorders in the 1970s, video-recording devices have become commonplace. Such devices are often used to "time shift" television programs for viewing at a later time. Whether or not the recorded programs are viewed soon after being broadcast, many people like to keep the recorded programs for an extended period of time. With a videocassette recorder (VCR), this is easily accomplished by simply keeping a library of videocassettes with desired programs.

Digital video recorders (DVRs) that utilize a non-removable magnetic disk recording medium, also referred to as a hard disk drive (HDD), are rapidly growing in popularity. Keeping an archival copy of a program recorded on a DVR is somewhat more problematic than in the case of a VCR. Since the fixed disk has a finite recording capacity, only a limited number of programs may be permanently stored. One solution is to make archival copies of recordings on another recording medium, such as a videocassette. Digital video disk (DVD) recorders have recently become available, which permit higher quality archival copies of recorded programs. Consumer electronics devices are now available that combine a DVR and a DVD recorder.

Television viewers often desire to keep archival copies of related programs, such as successive episodes of a TV series. If the viewer wishes to fully utilize the storage capacity of a recordable DVD, the viewer would have to calculate the aggregate length of programs that have been temporarily stored on a DVR and then assemble the programs for recording onto the DVD. This can be a tedious process, and, therefore, a need exists for a user-interface that will simplify the process.

DVDs and other archival storage media may be more efficiently used if unwanted portions of the recorded programs are omitted before the archival copy is made. For example, a typical one hour television program that is broadcasted in prime time is actually only about forty minutes in length, the remaining time comprising commercial messages, announcements, previews and other non-program material. The effective storage capacity of a DVD can be increased by approximately fifty percent if such non-program material is omitted (e.g., a two hour DVD could store three edited one hour programs instead of two unedited programs). Apart from the savings in storage media, it is well documented that most viewers prefer to view programs without commercial interruptions.

SUMMARY OF THE INVENTION

The present invention provides a method and apparatus for conveniently aggregating a plurality of recorded audiovisual programs for archival storage on another storage medium, such as a DVD. As related programs are temporarily recorded on a DVR, the lengths of the programs are summed and compared to the recording capacity of the DVD. When a sufficient number of programs have been temporarily recorded, a message is presented prompting the user to transfer the recordings to a DVD. Portions of the recorded programs, such as commercial messages, may be edited or deleted before transfer to DVD. When programs are recorded onto a DVD, program information may also be recorded to assist in navigating among the recorded programs. The program information may also be used for the purpose of printing appropriate labels using a personal computer system.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
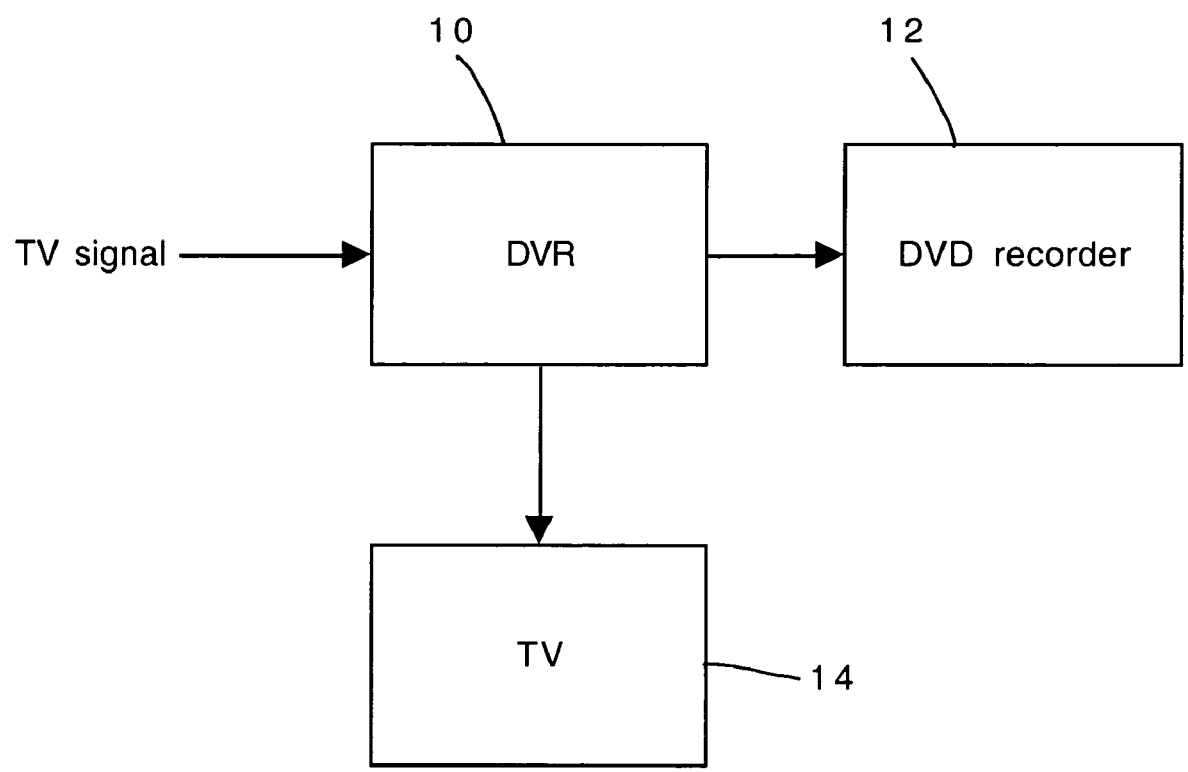
FIG. 1 is a functional block diagram of a video recording system in which the present invention may be practiced.

FIG. 1 is a functional block diagram of a video recording system in which the present invention may be implemented. While the invention is described in the context of a video recording system for television broadcasts, it should be understood that the invention is applicable to the recording of all types of audiovisual programs consisting of images, sounds, (e.g., music) or a combination of both.

A broadcast television signal, which may be provided by an antenna, a satellite receiver or a cable service, is received at digital video recorder (DVR) 10. An output from DVR 10 is provided as an input to television monitor 14 so that programs recorded on the DVR may be displayed. DVR 10 includes a graphics generator for providing program information, messages and other displays to a TV viewer. An output from DVR 10 is provided as an input to digital video disk (DVD) recorder 12 so that programs recorded on the DVR may be archived on a DVD. DVR 10 and DVD 12 may be physically separate devices or may be combined into a single device.

Figure 2:
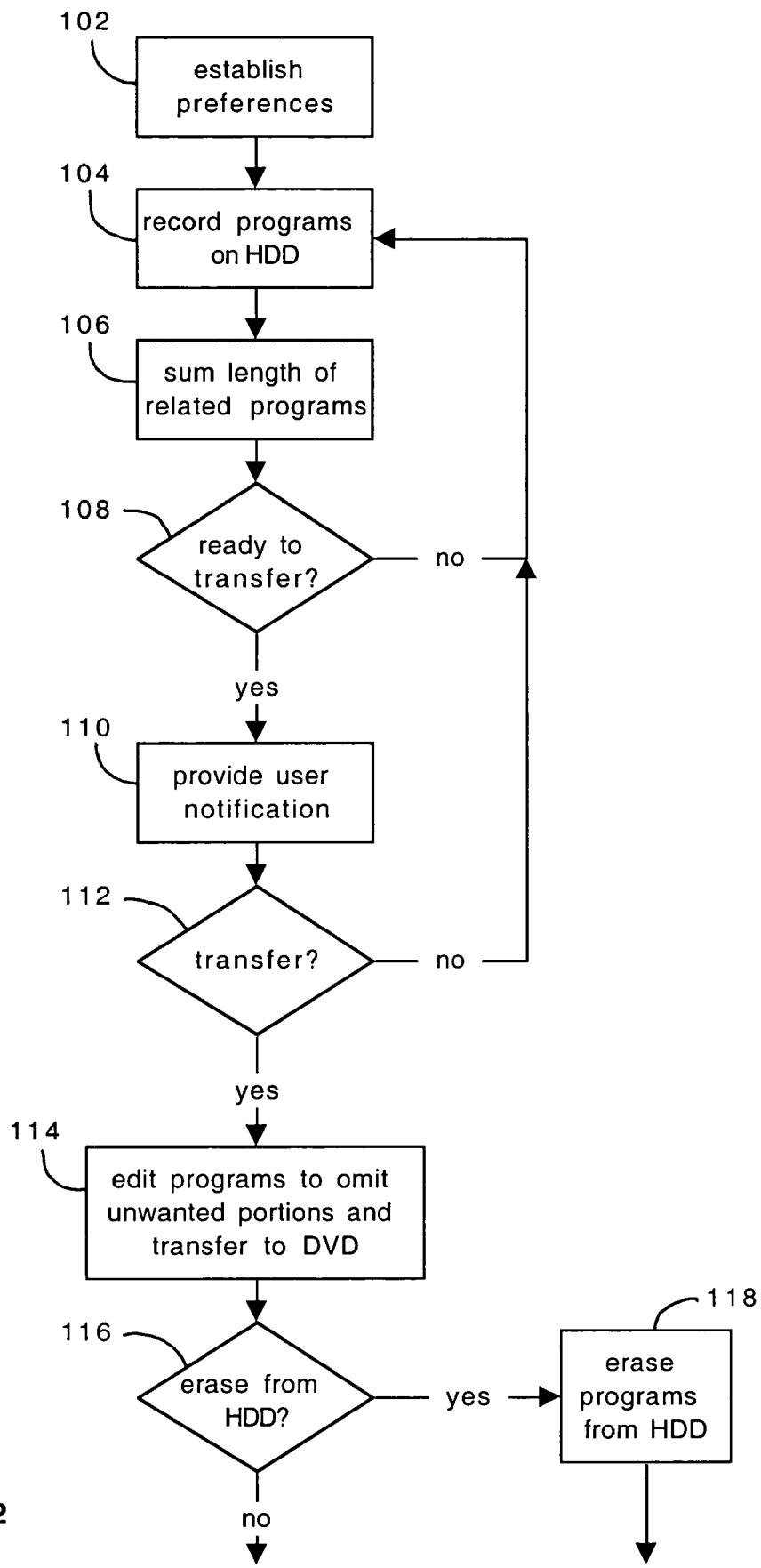
FIG. 2 is a functional flow diagram of a method in accordance with one embodiment of the invention.

Referring now to FIG. 2, a functional flow diagram for implementing one embodiment of the invention is presented. The described process is preferably implemented by a processor in the DVR (or a DVR/DVD recorder combination) executing a sequence of stored instructions. At 102, a user is prompted to establish various preferences. Among such preferences are the maximum capacity of the DVD or other archival recording medium being used, the program title(s) to be archived and whether or not programs are to be archived in an edited or unedited format. These preferences may be set at any time, either before or after programs are recorded on the DVR's hard disk drive (HDD).

The DVR records programs at 104 in accordance with selections made by the user (such selections are independent of the preferences established at 102). One of the features of most commercially available DVRs is the ability to record a personal "channel" of programs. The programs may comprise episodes of a television series. Alternatively, a viewer may establish preferences in the DVR to record programs of a particular genre, programs featuring a particular performer or programs about particular subject matter. If a viewer wishes to keep archival copies of recorded programs, the viewer will most likely wish to keep like programs together on the same storage medium.

As programs are recorded, the lengths of related programs are summed at 106. Typically, "related" programs will be individual episodes of a television series. However, other program relationships, such as the personalized "channels" described above, may be established as part of the user preferences. The lengths of the programs are either in edited or unedited format as established by the user at 102. One form of editing is the removal of commercial messages and other non-program messages that are broadcast during a "commercial break". Methods for automatically removing such messages are documented in this inventor's prior U.S. Pat. Nos. 5,333,091; 5,692,093; 5,696,866; 5,987,210 and 5,999,688, the disclosures of which are incorporated herein by reference. Recording devices implementing the methods described in these prior patents have been widely marketed under the trademarks Commercial Advance® and Show|Nav™.

At 108, the cumulative lengths of related program groups are compared to the DVD capacity. If there are a sufficient number of related programs so that their cumulative length will fill a DVD to capacity (i.e., there would be insufficient room to record an additional program), the programs are ready to transfer to the DVD. Otherwise, additional programs are recorded onto the HDD. Of course, this process may be over-ridden by the user, who may elect to transfer programs from the HDD to a DVD at any time. If the system determines that programs are ready for transfer, a notification is provided for the user at 110. Such notification is optional; the user may establish a preference to automatically transfer programs to a DVD once the capacity criteria has been met. After receiving the notification at 110, the user may issue a command at 112 to begin the transfer process. The user may have the option to transfer the programs to a DVD immediately or to begin the transfer at some later designated time, such as in the early morning hours. At 114, the programs are edited to remove unwanted portions (if such action has been selected by the user) and the programs are transferred to a DVD.

Once the programs have been transferred to a DVD, they may be erased from the HDD at the user's option. The user's decision whether or not to erase the programs from the HDD may be made when the user's preferences are established at 102, when the instructions to initiate transfer are given at 112 or subsequent to the transfer at 116. If the user has elected to erase the programs from the HDD, such action is taken at 118.

Numerous variations of the above-described process may be implemented. For example, if the number of related programs stored on the HDD exceeds the capacity of the DVD, the user may elect to transfer all such programs onto multiple DVDs. An appropriate prompt may be provided for the user to insert a new DVD when transfer to a DVD has been completed.

The transfer of programs to a DVD at 114 may be accompanied by the writing of program information onto the DVD. Such program information is commonly available within the DVR from subscription sources or from encoding within the television signal. Such information may include, for example, the program title, the episode title, the actors and their character roles, the episode plot, etc. The program information may be presented to the viewer in the form of an interactive chapter guide for navigating through the contents of the DVD.

The program information is preferably written onto the DVD in a format that may be accessed by a personal computer. Once recording onto a DVD has been completed, the user may insert the DVD into a personal computer to retrieve the program information. This information may then be used to generate printed labels for the DVD and/or for a DVD storage case. Alternatively, a special-purpose printer may be built into the recording device to print the program information onto a supply of pre-formatted labels.

While the present invention has been described in the context of a method and apparatus for making archival copies of recorded television programs using a DVD recorder, it will be understood that other recording media may be used to make archival copies. For example, archival copies may be made on videocassettes using a conventional VCR. The process described above in connection with FIG. 2 would be identical. Furthermore, the invention may be applied to make archival copies of other types of audiovisual programs.

It will be recognized that the above-described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A method for making an archival recording comprising:
   sequentially recording a plurality of programs on a first recording medium;
   calculating a cumulative recording length after each of the plurality of programs is recorded;
   comparing the cumulative recording length of a set of n programs to a storage capacity of a second recording medium;
   estimating a cumulative recording length of a set of n+1 programs;
   automatically recording the set of n programs onto the second recording medium from the first recording medium when the cumulative recording length of the set of n programs is less than or equal to the storage capacity of the second recording medium and the estimated cumulative recording length of the set of n+1 programs is greater than the storage capacity of the second recording medium.

2. The method of claim 1 further comprising erasing the set of n programs from the first recording medium after the set of n programs has been recorded onto the second recording medium.

3. The method of claim 1 wherein one or more of the programs recorded onto the second recording medium are edited to omit a portion of the respective program recorded on the first recording medium.

4. The method of claim 1 further comprising recording program identification data onto the second recording medium.

5. The method of claim 4 further comprising generating a label for the second recording medium using the program identification data recorded thereon.

6. The method of claim 1 wherein the first recording medium is a magnetic disk.

7. The method of claim 1 wherein the second recording medium is a digital video disk (DVD).

\* \* \* \* \*